United States Patent [19]

Moriya et al.

[11] Patent Number: 5,085,708
[45] Date of Patent: Feb. 4, 1992

[54] LIGNOSULFONATES, OXYCARBOXYLATES, POLYCARBOXYLATES, AND POLYOXALKLENE, ALKYLARYL AND ALKYL ETHERS ADMIXTURES FOR ULTRA-DRY MIX CONCRETE

[75] Inventors: Yoshitaka Moriya, Chiba; Hiroshi Nomachi; Makoto Takada, both of Chigasaki; Yukihide Takatsu, Hiratsuka; Kenichi Umezawa, Fujisawa, all of Japan

[73] Assignee: Sandoz Ltd., Basel, Switzerland

[21] Appl. No.: 645,386

[22] Filed: Jan. 24, 1991

Related U.S. Application Data

[63] Continuation of Ser. No. 298,458, Jan. 18, 1989, abandoned.

[30] Foreign Application Priority Data

Jan. 20, 1988 [JP] Japan .................................. 63-8387

[51] Int. Cl.$^5$ ...................... C04B 24/00; C04B 24/02; C04B 24/10
[52] U.S. Cl. ..................................... 106/819; 106/708; 106/709; 106/724; 106/802; 106/804; 106/805; 106/810; 106/DIG. 1
[58] Field of Search ............... 106/724, 802, 804, 805, 106/810, 708, 709, DIG. 1, 819

[56] References Cited

U.S. PATENT DOCUMENTS 4,102,697  7/1978  Fukuba et al. ...................... 106/109

FOREIGN PATENT DOCUMENTS

| 56-059661 | 5/1981 | Japan | 106/90 |
| 60-127253 | 7/1985 | Japan | 106/90 |
| 60-042260 | 3/1987 | Japan | 106/90 |

Primary Examiner—Mark L. Bell
Assistant Examiner—Anthony J. Green
Attorney, Agent, or Firm—Gerald D. Sharkin; Robert S. Honor; Walter F. Jewell

[57] ABSTRACT

An admixture for ultra-dry-mix concrete is disclosed containing one or more varieties of cement dispersing agents (A) selected from a group consisting of lignosulfonates, oxycarboxylates and polycarboxylates, and in addition, containing one or more varieties of nonionic surface-active agents (B) selected from a group consisting of polyoxyalkylene alkylaryl and alkyl ethers with a hydrophilic-lipophilic balance (HLB-value) of 8 to 17.

7 Claims, No Drawings

LIGNOSULFONATES, OXYCARBOXYLATES, POLYCARBOXYLATES, AND POLYOXALKLENE, ALKYLARYL AND ALKYL ETHERS ADMIXTURES FOR ULTRA-DRY MIX CONCRETE

This is a continuation of application Ser. No. 07/298,458, filed Jan. 18, 1989, now abandoned.

This invention concerns an admixture for ultra-dry-mix concrete.

Ultra-dry-mix concrete is a concrete with extremely low unit water content of 80 to 100 kg/m$^3$, which is dry and crumbly, will not flow from itself and is a concrete on which slump cannot be measured, so that it is called no-slump concrete.

The RCD (Roller Compacted Dam) method developed in recent years for construction of dam bodies uses ultra-dry-mix concrete which is consolidated by vibratory roller to a given density. The results obtained are shortening of construction time and savings in construction cost.

Concrete admixtures which have been used for this ultra-dry-mix concrete are cement dispersing agents which are capable of improving workability and reducing unit water content. Such cement dispersing agents include those mainly consisting of lignosulfonates.

However, when these cement dispersing agents are used alone, water-reducing properties and strength can be secured to a certain extent and it will be possible to manufacture ultra-dry-mix concrete, as long as the quality of aggregate is good and particle shapes are also good, but the quality of aggregates used in recent dam construction continues to become poorer as aggregate resources from rivers have become depleted, and in case of using aggregates of such low quality, it is difficult to adequately secure water-reducing properties and strength, even though the quantity of cement dispersing agent is increased.

Further, when ultra-dry-mix concrete is used for RCD concrete, concrete transported to the work site is spread by bulldozer and then rolled and compacted by vibratory roller, and when 2 to 3 hours are required for spreading, the consistency of the fresh concrete will be impaired and the effect of consolidation will be poor even though stronger vibration is used, and thus improvement of this situation has been called for.

Meanwhile, when the dosage of a conventional cement dispersing agent is increased in order to resolve the abovementioned problem, in case of lignosulfonate-based admixtures and certain types of polycarboxylic acid-based dispersing agents, not only the setting and hardening times of the fresh concrete are retarded, but also the entrained air content becomes higher than intended and adverse effects result on the strength and density of the hardened concrete. In case of a dispersing agent of the oxycarboxylic acid type, air content is not increased, but there will still be the problem of retardation of hardening, and it finally has not been possible to resolve the problem with conventional dispersing agents only.

There has now been found an admixture for concrete which is effective in preventing reduction in fluidity of fresh concrete during a certain time and also increases the strength of hardened concrete by using in combination one or more varieties of cement dispersing agents (A) selected from the group consisting of lignosulfonates, oxycarboxylates and polycarboxylates, and in addition, one or more varieties of non-ionic surface-active agents (B) selected from the group consisting of polyoxyalkylene alkylaryl ethers and polyoxyalkylene alkyl ethers, which admixture can be added to ultra-dry-mix concrete to be placed by rolling.

This invention will be explained in detail below.

The previously-mentioned lignosulfonates are manufactured industrially from waste sulfite liquor as the raw material and are commonly known as cement dispersing agents. Normally, one of the sodium, potassium, calcium, ammonium, magnesium and amine salts is used.

As the previously-mentioned oxycarboxylates, specifically, sodium, potassium, calcium, magnesium, ammonium and amine salts of gluconic acid, diketogluconic acid and pentaketogluconic acid may be cited as examples, these products being manufactured by an electrolytic oxidation method, chemical oxidation method or a fermentation method using oxidizing bacteria, from sugars or waste molasses as the raw material.

The previously-mentioned polycarboxylates are cement dispersing agents with soluble salts of copolymers of alpha and beta unsaturated carboxylic acids and olefins as the effective ingredients, homopolymers of esters of polyethylene glycol monoaryl ethers and maleic acid as monomers and copolymers derived from monomers possible to copolymerize with these, homopolymers of polyalkylene glycol mono(meth)acrylic acid ester or (meth)acrylic acid and copolymers derived from monomers possible to copolymerize with these monomers.

The nonionic surface active agents (B) used for the ultra-dry-mix concrete admixture of this invention are selected from the group of polyoxyalkylene alkylaryl ethers and polyoxyalkylene alkyl ethers, and these are general purpose nonionic surface-active agents manufactured in chemical industry. These nonionic surfactants (B) should have a sufficient permeability for the inorganic hydrophilic substances contained in concrete and it has been shown that surfactants with a hydrophilic-lipophilic balance (HLB-value) of 8-17, preferably 10-14 have the necessary permeability. Surfactants with a HLB-value lower than 8 have a higher permeability to lipophilic substances and are, therefore, unsuitable. Surfactants with a HLB-value higher than 17 have a low adsorbability, caused by their high molecular weight, and are also not suitable. The nonionic surfactants of the above mentioned classes of compounds with a HLB-value from 8 to 17 are polyoxyethylene ethers with a number of ethylene oxide units from 5 to 15. Those with a number of 8 to 10 ethylene oxide units are especially preferred and have a HLB-value of 10-14 and a permeating power lower than 30 seconds, determined by the canvas disk method at 25° C. with an 0.1 percent aqueous solution.

The dosages of the cement dispersing agents (A) are in the range of 0.15 to 0.80 percent, preferably 0.40–0.65 percent by weight of cement or total weight of cement and fly ash in terms of solids in the case of lignosulfonates and oxycarboxylates, in the case of polycarboxylates the dosage is preferably 0.02 to 0.20 percent by weight. If the dosages of the cement dispersing agents (A) are below these ranges, the water-reducing effects will not be improved, while with dosages above these ranges entrained air content will be excessive and the retardation of hardening so prominent that strength gain will be affected.

The amounts of nonionic surface-active agent (B) used in order to obtain favourable results are in case of lignosulfonates 1 to 35 parts by weight of (B), preferably 3 to 20 parts by weight on 100 parts by weight of (A), in case of oxycarboxylates 1 to 100 parts by weight of (B), preferably 5 to 50 parts by weight on 100 parts by weight of (A) and in case of polycarboxylates, 1 to 100 parts by weight, preferably 5 to 50 parts by weight, on 100 parts by weight of (A). In general, amounts of 0.01 to 0.05 percent, preferably 0.03 percent by weight of cement or total weight of cement and fly ash in terms of solids will be needed.

The cement dispersing agent (A) and the nonionic surface-active agent (B) may be individually added at the time of mixing concrete, but the two components (A) and (B) may both be mixed with concrete mixing water and added simultaneously.

The following examples further illustrate the invention.

EXAMPLES

The materials used, the mix proportions and methods of testing are as described below.

1. Materials (1) Cement:
Moderate heat portland cement
(2) Fly ash:
Commercial product
(3) Fine aggregate:
River sand, specific gravity=2.62
(4) Coarse aggregate:
Crushed stone, maximum size=150 mm, specific gravity=2.67
(5) Cement dispersing agent:
Pozzolith No. 8 (main ingredient lignosulfonate, powder, mfd. by Nisso Master Builders Co., Ltd. hereinafter abbreviated as "L")
Sodium gluconate (industrial chemical, powder, hereinafter abbreviated as "G")
Aquarock PM-006 (polycarboxylate, powder, mfd. by Nippon Shokubai Kagaku Kogyo Co., Ltd., hereinafter abbreviated as "P")
(6) Nonionic surface-active agent:
Noigen EA70=polyoxyethylene (n=5) nonyl phenyl ether, mfd. by Dai-ichi Kogyo Seiyaku Co., Ltd., hereinafter abbreviated as "a", with HLB=8 and permeating power over 200 sec.
Noigen EA130T=polyoxyethylene (n=10) nonyl phenyl ether, mfd. by Dai-ichi Kogyo Seiyaku Co., Ltd., hereinafter abbreviated as "b", with HLB=13 and permeating power 17 sec.
Noigen EA170=polyoxyethylene (n=15) nonyl phenyl ether, mfd. by Dai-ichi Kogyo Seiyaku Co., Ltd., hereinafter abbreviated as "c", with HLB=17 and permeating power over 200 sec.
Noigen EA126=polyoxyethylene (n=8) alkyl aryl ether, mfd. by Dai-ichi Kogyo Seiyaku Co., Ltd., hereinafter abbreviated as "d", with HLB=12 and permeating power 18 sec.

2. Mix proportions of Concrete and Method of Testing

The mix proportions of the ultra-dry-mix concrete were set in accordance with the RCD Construction Method Engineering Guideline (Draft) edited by the Technology Center for National Land Development. Per 1 $m^3$ of concrete the cement content was 91 kg, fly ash content was 39 kg (F/C+F)×100=30% with C indicating cement and F indicating fly ash), the content of fine aggregate was 30 percent and the unit water contents for the examples 1 to 5 of this invention and for the control examples 1 to 11, respectively, such that consistencies as determined by the Vibratory Consistency Testing Method in Appendix 1 of the said Guideline (Draft) would be 20+/−2 sec in terms of VC values. The VC value is a value expressing the consistency of an ultra-dry-mix concrete, in units of seconds, a smaller value indicating wetness.

The air content of concrete after vibratory consolidation was determined by a gravimetric method adapted from the Test Method for Unit Weight of Mortar in Appendix 2 of the said Guideline (Draft), while compressive strengths were tested at ages of 28 days and 91 days in accordance with JIS A 1108, Test Method for Compressive Strength of Concrete, on specimens made in accordance with Method of Making Specimens for Compressive Strength Tests in Appendix 3 of the said Guideline (Draft) and after curing in water of 20°+/−3° C.

Cement dispersing agents and nonionic surface-active agents were added by dissolving the required quantities beforehand in the concrete mixing water.

The results of tests on concretes using various combinations of cement dispersing agent (A) and nonionic surface-active agent (B) are given in Tables 1 and 2.

TABLE 1

| | Cement Dispersing Agent (A) | | Nonionic Surface-Active Agent (B) | | | Evaluation of Concrete Performance | | | | | |
|---|---|---|---|---|---|---|---|---|---|---|---|
| | | | | Permeating Power (sec) | | Unit Water Content [kg/$m^3$] | VC Value (sec) | | Air Content (%) | Compressive Strength (kgf/$cm^2$) | |
| | Kind | Dosage* [x%] | Kind | | Dosage* [x%] | | Immediate | 3 hr After | | 28 d | 91 d |
| Example 1 | L | 0.55 | b | 17 | 0.03 | 85 | 20.5 | 29.6 | 1.4 | 135 | 239 |
| 2 | L | 0.55 | d | 18 | 0.03 | 85 | 21.0 | 29.8 | 1.4 | 137 | 241 |
| 3 | L | 0.25 | d | 18 | 0.01 | 90 | 20.1 | 34.5 | 1.3 | 111 | 199 |
| 4 | G | 0.15 | d | 18 | 0.03 | 85 | 20.8 | 30.9 | 1.5 | 126 | 218 |
| 5 | P | 0.10 | d | 18 | 0.03 | 85 | 20.2 | 31.2 | 1.6 | 127 | 211 |
| Control 1 | L | 0.25 | — | — | — | 95 | 21.0 | 38.9 | 1.3 | 96 | 169 |
| 2 | L | 0.40 | — | — | — | 90 | 21.5 | 45.3 | 1.5 | 101 | 175 |
| 3 | L | 0.55 | — | — | — | 85 | 21.1 | 43.0 | 1.6 | 107 | 186 |
| 4 | L | 0.80 | — | — | — | 85 | 21.0 | 48.3 | 2.5 | 94 | 163 |
| 5 | — | — | d | 18 | 0.01 | 95 | 21.9 | 37.4 | 1.4 | 95 | 169 |
| 6 | — | — | d | 18 | 0.03 | 90 | 21.6 | 36.4 | 1.6 | 96 | 167 |
| 7 | — | — | d | 18 | 0.05 | 90 | 21.2 | 39.9 | 2.6 | 85 | 153 |
| 8 | G | 0.15 | — | — | — | 85 | 20.3 | 45.2 | 1.3 | 108 | 180 |
| 9 | P | 0.10 | — | — | — | 85 | 21.4 | 47.3 | 1.5 | 105 | 183 |
| Example 6 | L | 0.55 | a | 60+ | 0.03 | 85 | 21.3 | 35.8 | 1.6 | 109 | 184 |
| Example 7 | L | 0.55 | c | 60+ | 0.03 | 85 | 21.2 | 38.1 | 1.5 | 107 | 185 |

*Dosage: Percent by total weight of cement and fly ash

TABLE 2

| Example | Cement Dispersing Agent Kind | Cement Dispersing Agent Dosage | Surface-Active Agent Kind | Surface-Active Agent Dosage | VC Value Difference (sec) 3 hr - Immediate | Compressive Strength Ratio (%) 28 d | Compressive Strength Ratio (%) 91 d | Effect on compressive strength |
|---|---|---|---|---|---|---|---|---|
| (1) Nonionic Surface-Active Agent Used Singly | | | | | | | | |
| Control 5 | — | — | d | 0.01 | 15.5 | 99* | 100* | No improvement with d only |
| Control 6 | — | — | d | 0.03 | 14.8 | 100* | 99* | " |
| Control 7 | — | — | d | 0.05 | 18.7 | 88* | 91* | " |
| | | | | | | | | *Comparison with value of Control 1 as 100 (%) |
| (2) Lignosulfonate Base Cement Dispersing Agent (L) Used | | | | | | | | |
| Control 1 | L | 0.25 | — | — | 17.9 | 100 | 100 | Standard product (normal dosage) |
| Control 2 | L | 0.40 | — | — | 23.8 | 105 | 104 | No effect increasing L only |
| Control 3 | L | 0.55 | — | — | 21.9 | 111(100) | 110(100) | Slight effect seen with increase of L (hereafter this to be standard) |
| Control 4 | L | 0.80 | — | — | 27.3 | 98 | 96 | Minus effect when L used excessively |
| Example 6 | L | 0.55 | a | 0.03 | 14.5 | 113(102) | 119(108) | No effect with L and a combined |
| Example 7 | L | 0.55 | c | 0.03 | 16.9 | 111(100) | 109(99) | No effect with L and c combined |
| Example 1 | L | 0.55 | b | 0.03 | 9.1 | 140(126) | 141(127) | Effective with L and b combined |
| Example 3 | L | 0.25 | d | 0.01 | 14.4 | 116 | 118 | Effective with L and d combined |
| Example 2 | L | 0.55 | d | 0.03 | 8.8 | 143(129) | 143(130) | Prominent effect with L and d combined |
| | | | | | | | | Figures in ( ) ratio with value of Control 3 as 100 (%) |
| (3) Oxycarboxylate Base Cement Dispersing Agent (G) Used | | | | | | | | |
| Control 8 | G | 0.15 | — | — | 24.9 | 100 | 100 | Standard product |
| Example 4 | G | 0.15 | d | 0.03 | 10.1 | 117 | 121 | Effective combined with d |
| (4) Polycarboxylate Base Cement Dispersing Agent (P) Used | | | | | | | | |
| Control 9 | P | 0.10 | — | — | 25.9 | 100 | 100 | Standard product |
| Example 5 | P | 0.10 | d | 0.03 | 11.0 | 121 | 115 | Effective combined with d |

As shown by the test results given in Table 1 and Table 2, the comparison of using the admixtures of this invention in ultra-dry-mix concrete and using conventional cement dispersing agents alone may be summarized as follows:

1. Little Variation in Consistency (VC Value) of Concrete 3 hours after mixing In case of using a cement dispersing agent (A) alone the difference is
17.9 to 23.8 sec with cement dispersing agent L,
24.9 sec with cement dispersing agent G,
25.9 sec with cement dispersing agent P,
whereas it is
9.1 sec with combined use of L and b,
8.8 to 14.4 sec with combined use of L and d,
10.1 sec with combined use of G and d,
11.0 sec with combined use of P and d.

2. Increase in Compressive Strength

With the dosages of cement dispersing agent used (L=0.25 and 0.55%, G=0.15%, P=0.10%), in combination with surface-active agents (B), the ratios of compressive strengths after 28 days and after 91 days, in comparison with the use of cement dispersing agent alone as 100, were:
116 to 118% in case of L (0.25%) and d (0.01%)
140 to 143% in case of L (0.55%) and b or d (0.03%)
117 to 121% in case of G (0.15%) and d (0.03%)
121 to 115% in case of P (0.1%) and d (0.03%)

3. Other effects (1) There is a water-reducing effect when using nonionic surface-active agent alone, the effect being roughly of the same degree as for using a lignosulfate-base dispersing agent at 0.25 percent, but no improvement in variation of VC value and increase of compresive strength can be seen, even when the dosage is increased (control examples 5, 6, 7).

(2) When using a lignosulfate-base cement dispersing agent alone with increasing dosages of up to 1.6 times [(C+F)×0.40] and 2.2 times [(C+F)×0.55] the standard dosage [0.25% of (fly ash+cement)], a slight increase in compressive strength of the concrete but no improvement in consistency (VC value) can be seen (control examples 1, 2, 3, 4).

(3) With nonionic surface-active agents having a rather small permeating power (a and c), there is no improvement of compressive strength and a small improvement in consistency (VC value) (examples 6 and 7).

As described in the foregoing, the admixture for ultra-dry-mix concrete of this invention is extremely effective in preventing variation of consistency (hardening) and increasing compressive strength of ultra-dry-mix concrete.

We claim:

1. An admixture for ultra-dry-mix concrete containing cement or cement and fly ash, containing (A) one or more varieties of cement dispersing agents selected from the group consisting of lignosulfonates, oxycarboxylates and polycarboxylates, and (B) one or more varieties of nonionic surface-active agents selected from the group consisting of polyoxyalkylene alkylaryl and alkyl ethers with a hydrophilic-lipophilic balance (HLB-value) of 8 to 17, (A) and (B) being present in quantities such that:
   (i) when (A) is a lignosulfonate or an oxycarboxylate, it comprises from 0.15 to 0.80% by weight of cement or cement and fly ash, and when (A) is a polycarboxylate it comprises from 0.02 to 0.20% by weight of cement or cement and fly ash;
   (ii) when (A) is a lignosulfonate, (B) is present in an amount from 1 to 35 parts by weight per 100 parts of (A); and
   (iii) when (A) is a oxycarboxylate or a polycarboxylate, (B) is present in an amount 1 to 100 parts by weight per 100 parts of (A).

2. An admixture according to claim 1, wherein the nonionic surface-active agents (B) are selected from the group of polyoxyethylene alkylaryl ethers having from 5 to 15 ethylene oxide units.

3. An admixture according to claim 1 or 2, wherein the non-ionic surface-active agent (B) is a polyoxyethylene alkylaryl ether having from 8 to 10 ethylene oxide units and a HLB-value of 10 to 14.

4. An admixture according to claim 3, wherein the cement dispersing agent (A) is a lignosulfonate.

5. Ultra-dry-mix concrete containing an admixture according to claim 1.

6. Ultra-dry-mix concrete according to claim 5 containing lignosulfonate and a surface-active agent selected from the group of polyoxyethylene alkylaryl ethers having from 8 to 10 ethylene oxide units and a HLB-value of 10 to 14.

7. An ultra-dry mix concrete containing cement or cement and fly ash containing (A) one or more varieties of cement dispersing agents selected from the group consisting of lignosulfonates, oxycarboxylates and polycarboxylates, and (B) one or more varieties of nonionic surface-active agents selected from the group consisting of polyoxyalkylene alkylaryl and alkyl ethers with a hydrophilic-lipophilic balance (HLB-value) of 8 to 17, (A) and (B) being present in quantities such that:

(i) when (A) is a lignosulfonate or an oxycarboxylate, it comprises from 0.15 to 0.80% by weight of cement or cement and fly ash, and when (A) is a polycarboxylate it comprises from 0.02 to 0.20% by weight of cement or cement and fly ash;

(ii) when (A) is a lignosulfonate, (B) is present in an amount from 1 to 35 parts by weight per 100 parts of (A); and (iii) when (A) is a oxycarboxylate or a polycarboxylate, (B) is present in an amount 1 to 100 parts by weight per 100 parts of (A).

* * * * *